(12) United States Patent
Shaver

(10) Patent No.: US 6,948,113 B1
(45) Date of Patent: Sep. 20, 2005

(54) SELF-THROTTLING ERROR-CORRECTION BUFFER AND METHOD FOR A DISC DRIVE

(75) Inventor: Jimmie R. Shaver, Yukon, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/552,973

(22) Filed: Apr. 20, 2000

Related U.S. Application Data

(60) Provisional application No. 60/130,276, filed on Apr. 21, 1999.

(51) Int. Cl.[7] .............................................. G06F 13/12
(52) U.S. Cl. ............................ 714/769; 710/52; 710/60
(58) Field of Search ........................... 714/769; 710/52, 710/60

(56) References Cited

U.S. PATENT DOCUMENTS

| | | | |
|---|---|---|---|
| 4,227,245 A | 10/1980 | Edblad et al. ............... 364/468 |
| 4,379,332 A | 4/1983 | Busser et al. ........... 364/431.05 |
| 4,843,544 A | 6/1989 | DuLac et al. ................ 364/200 |
| 4,965,801 A | 10/1990 | DuLac ....................... 371/40.1 |
| 4,979,054 A | 12/1990 | McCullough et al. ......... 360/48 |
| 4,979,055 A | 12/1990 | Squires et al. ................ 360/69 |
| 5,014,237 A | 5/1991 | Masters et al. ............. 364/900 |
| 5,016,121 A | 5/1991 | Peddle et al. ................. 360/39 |
| 5,065,321 A | 11/1991 | Bezos et al. ........... 364/424.04 |
| 5,075,805 A | 12/1991 | Peddle et al. ................. 360/61 |
| 5,185,700 A | 2/1993 | Bezos et al. ........... 364/424.04 |
| 5,231,047 A | 7/1993 | Ovshinsky et al. ......... 437/101 |
| 5,255,136 A | 10/1993 | Machado et al. ......... 360/77.02 |
| 5,261,058 A | 11/1993 | Squires et al. ............... 395/275 |
| 5,274,773 A | 12/1993 | Squires et al. ............... 395/275 |
| 5,276,662 A | 1/1994 | Shaver, Jr. et al. ........... 369/32 |
| 5,313,589 A | 5/1994 | Donaldson et al. ......... 395/275 |
| 5,317,713 A | 5/1994 | Glassburn ................... 395/425 |
| 5,327,347 A | 7/1994 | Hagenbuch ............ 364/424.07 |
| 5,412,666 A | 5/1995 | Squires et al. ............. 371/37.4 |
| 5,610,808 A | 3/1997 | Squires et al. ............... 364/131 |
| RE35,590 E | 8/1997 | Bezos et al. ........... 364/424.04 |
| 5,683,561 A | 11/1997 | Hollars et al. .......... 204/298.25 |
| 5,784,390 A | 7/1998 | Masiewicz et al. ...... 371/40.11 |
| 5,864,568 A * | 1/1999 | Nemazie ..................... 714/769 |
| 6,332,206 B1 * | 12/2001 | Nakatsuji et al. ........... 714/755 |
| 6,401,168 B1 * | 6/2002 | Williams et al. ............ 711/112 |

* cited by examiner

Primary Examiner—Stephen M. Baker
(74) Attorney, Agent, or Firm—David K. Lucente; Derek J. Berger

(57) ABSTRACT

A method and apparatus for an error-correction buffer having self-throttling data burst control in a disc drive. One aspect of the present invention provides an arbitration-throttling control circuit for use in a disc drive to self-throttle the data transfer of an error-correction buffer. The arbitration-throttling control circuit includes a control circuit having an error-correction buffer interface and a disc-drive main buffer memory interface for controlling data transfer from the error-correction buffer to a disc-drive main buffer in a plurality of data bursts. The control circuit arbitrates for access to transfer data into the disc-drive main buffer such that a series of data bursts from the error-correction buffer to the disc-drive main buffer are spread substantially evenly over a period of time.

21 Claims, 7 Drawing Sheets

SELF-THROTTLING ERROR-CORRECTION BUFFER AND METHOD FOR A DISC DRIVE

RELATED APPLICATIONS

This application claims the benefit under 35 U.S.C. 119(e) of U.S. Provisional Application Ser. No. 60/130,276 filed Apr. 21, 1999.

FIELD OF THE INVENTION

The present invention relates to the field of mass-storage devices. More particularly, this invention relates to a method and apparatus for an error-correction buffer having self-throttling data burst control in a disc drive.

BACKGROUND OF THE INVENTION

Devices that store data are key components of any computer system. Computer systems have many different types of devices where data can be stored. One common device for storing massive amounts of computer data is a disc drive. The basic parts of a disc drive are a disc assembly having at least one disc that is rotated, an actuator that moves a transducer to various locations over the rotating disc, circuitry that is used to write and/or read data to and from the disc via the transducer, and a bus interface to connect the disc drive into a data-handling system, such as a host computer. The disc drive also includes circuitry for encoding data so that it can be successfully written to, and retrieved from, the disc surface. A microprocessor controls most of the operations of the disc drive, including operations that pass the data back to a requesting computer and receive data from a requesting computer for storing to the disc.

A typical magnetic disc drive includes a transducer head for writing data onto circular or spiral tracks in a magnetic layer the disc surfaces and for reading the data from the magnetic layer. In some drives, the transducer includes an electrically driven coil (or "write head") that provides a magnetic field for writing data, and a magneto-resistive (MR) element (or "read head") that detects changes in the magnetic field along the tracks for reading data. Some MR elements include giant magneto-resistive (GMR) technology.

The transducer is typically placed on a small ceramic block, also referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the head away from the disc. At the same time, the air rushing past the cavity or depression in the air-bearing surface produces a negative pressure area. The negative pressure or suction counteracts the pressure produced at the rails. The slider is also attached to a load spring that produces a force on the slider directed toward the disc surface. The various forces equilibrate so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc-drive systems read and/or write information stored on tracks on storage discs. Transducers, in the form of read and/or write heads attached to the sliders, located on both sides of the storage disc, read and/or write information on the storage discs when the transducers are accurately positioned over one of the designated tracks on the surface of the storage disc. An example of a disc drive that only reads data (and thus only includes a read head) is a compact disc read-only memory (CDROM) drive. In some disc drives, the tracks are a multiplicity of concentric circular tracks. In other disc drives, a continuous spiral is one track on one side of a disc drive. Servo positioning information written on the disc(s) is used to accurately locate the transducer.

The transducer is also said to be moved to a "target track." Once the storage disc spins and the write head is accurately positioned above a target track, the write head can store data onto a track by writing information representative of data onto the storage disc. Similarly, reading data on a storage disc is accomplished by positioning the read head above a target track and reading the stored material on the storage disc. To write on or read from different tracks, the read/write head is moved radially across the tracks to a selected target track in an operation called a "seek." A seek is movement of an actuator assembly from a first track to a second target track.

One or more buffer memories are typically provided within the disc drive. These buffer memories are used to receive data from the disc transducer(s) at one rate and period of time, to send data to other buffers within the disc drive and external to the disc drive at another rate and/or period of time, and as temporary storage for operations on the data itself. Such operations on the data itself can include error correction operations such as correcting errors by using redundant information in the data, or adding such redundant information so that errors occurring later may be corrected. By receiving data at one rate and transmitting data at another rate, the buffer memories match the respective data speeds. For example, data is received from the disc at a rate determined by the rotational speed of the disc or the data density on a particular track, either or both of which can vary from the inner diameter of the disc to the outer diameter. Data is sent to the host computer or data-handling system at a speed determined by the host interface.

High-speed busses can have several data channels. A data channel will typically "burst" data to the bus for a short period of time, and then release the bus for use by other channels. Bus hogging can occur if one channel on the bus performs a data burst that takes a relatively long time, thus depriving other channels of access to the bus to perform their data transfers, and increasing their data latency.

There is also a need for an inexpensive method and apparatus that limits bus hogging and provides fair access to critical bus resources.

SUMMARY OF THE INVENTION

A method and apparatus is described for an error-correction buffer having self-throttling data burst control in a disc drive.

One aspect of the present invention provides an arbitration and buffer controller circuit for use in a disc drive to self-throttle data transfer of an error-correction buffer in the disc drive. The arbitration and buffer controller circuit includes an error-correction buffer interface. This interface monitors a disc data rate corresponding to a speed of reception of data from a disc transducer head into the error-correction buffer. The disc data rate depends on disc rotational speed and disc data density, and typically varies from the inner diameter to the outer diameter of the disc. The arbitration and buffer controller circuit also includes a disc-drive main buffer memory interface for controlling data transfer from the error-correction buffer to a disc-drive main buffer memory in a plurality of data bursts, each data burst having a first predetermined "burst" quantity of data. A control circuit arbitrates for access to transfer data into the disc-drive main buffer memory such that a series of data bursts totaling a sector of data out of the error-correction buffer into the disc-drive main buffer memory is spread evenly over a period of time equal to a sector transfer time of data into the error-correction buffer.

Another aspect of the present invention provides a disc-drive system. The disc drive system includes a disc case, a disc rotatably mounted within the disc case, and an actuator assembly mounted within the disc case. The actuator assembly includes a transducer head in a transducing relationship to the disc. The disc drive system also includes the arbitration and buffer controller circuit described above. The disc-drive system further includes a system interface, a disc-drive controller, and a buffer controller. The disc-drive controller is operatively coupled to transfer data between the disc-drive main buffer memory and the system interface. The buffer controller resolves arbitrations for access to transfer data to or from the disc-drive main buffer memory such that data bursts totaling a sector quantity of data transferred from the error-correction buffer to the disc-drive main buffer memory are spread substantially evenly over a period of time substantially equal to a transfer time of the sector quantity of data from the disc into the error-correction buffer.

Some embodiments of disc-drive system further include a data-handling system operatively coupled to at least read data from the disc. The data-handling system further includes one or more data processors, one or more memories operatively coupled to each one of the one or more data processors, and at least one input/output system coupled to the data processors to receive input data and to supply output data.

Another aspect of the present invention provides a method for self-throttling data transfer in an error-correction buffer in a disc drive. The method includes receiving data into the error-correction buffer from a disc transducer at a disc data rate, and transferring the data out of the error-correction buffer in a plurality of data bursts, each one of the data bursts having a burst data rate that is higher than the disc data rate. The data bursts have a spacing based on a timing signal derived from the disc data rate.

Yet another aspect of the present invention provides a disc drive system that includes a base plate, a rotatable disc mounted to the base plate, an actuator, the actuator including a transducer mounted to the actuator in transducing relation to the disc, and buffer memory means operatively coupled to the transducer for self-throttling data bursts of an error-correction buffer as described herein.

DESCRIPTION OF THE PREFERRED EMBODIMENT

Figure 1:
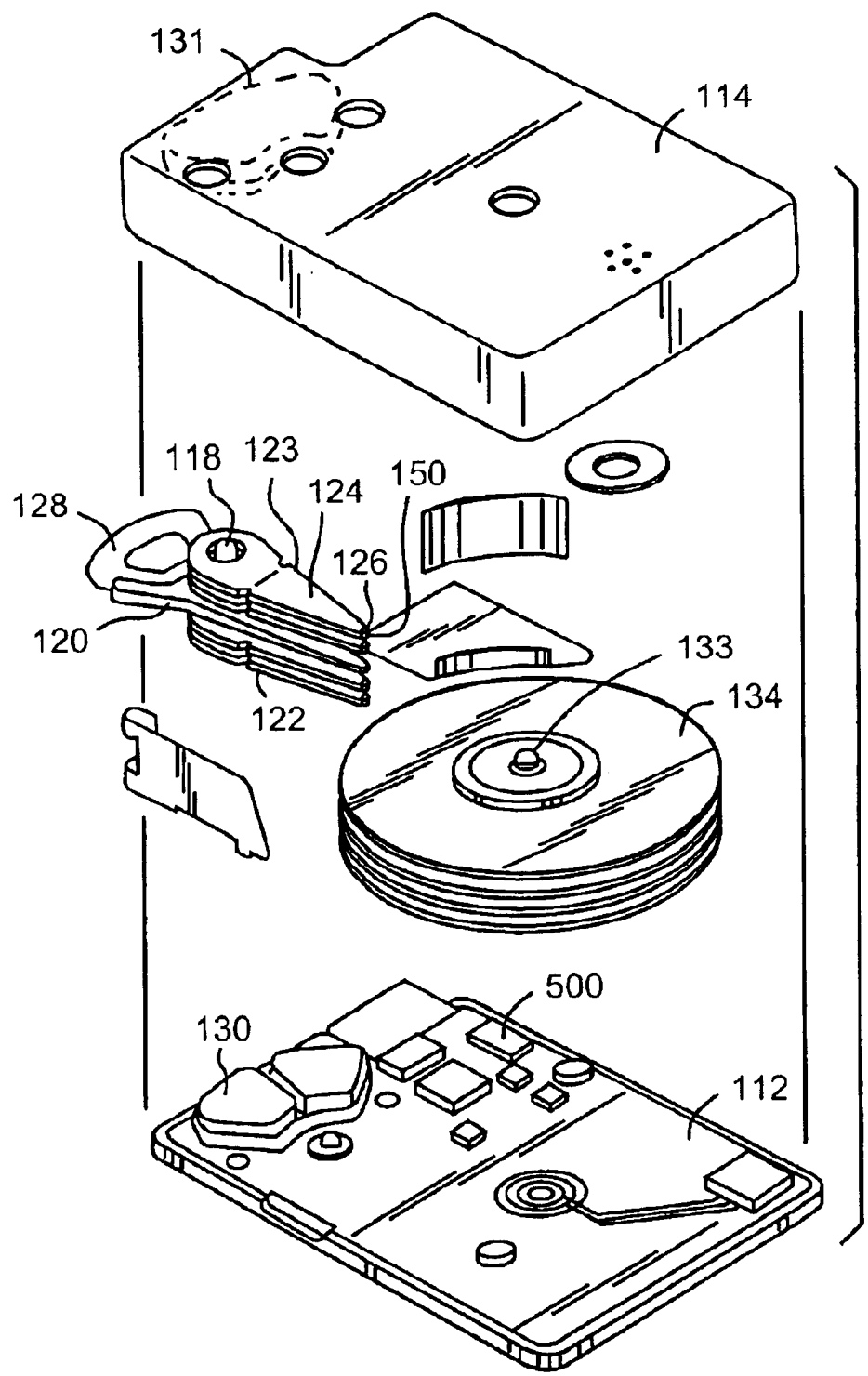
FIG. 1 is an exploded view of a disc drive 100 with a multiple disc stack.

In the following detailed description of the preferred embodiments, reference is made to the accompanying drawings that form a part hereof, and in to which are shown, by way of illustration, specific embodiments in which the invention may be practiced. It is to be understood that other embodiments may be utilized and structural changes may be made without departing from the scope of the present invention.

The invention described in this application is useful for all types of disc drives, including hard-disc drives, optical drives (such as CDROMs), ZIP drives, floppy-disc drives, and any other type of drives.

Modern disc drive systems incorporate powerful error correction codes (ECC) to improve the performance of the disc drive and the areal data density of their head-disc assemblies (HDAs). The best-performing of these drive systems contain digital circuitry which performs most or all of the ECC decoding and data correction "on-the-fly" with little or no impact to the system's overall data throughput.

However, as disc data rates in new disc drives increase to above and beyond 500 Megabits per second (Mbps), as media areal densities increase to near and above 10 Gigabits per square inch ($Gb/in^2$), as read channel signal to noise ratios (SNR) decrease, and as the number of micro media defects increases, the ECC decoders are pushed beyond their ability to decode data fields and perform corrections to the data in the data buffer in real time. One reason for this deficiency is that the system's data buffer bandwidth (that is, the average number of megabytes which the system can transfer to or from the buffer memory in one second) is limited, and the combination of faster disc data rates and higher raw disc data error rates causes the error correction circuitry to require more and more buffer bandwidth from the system.

One way to reduce the strain that the ECC decoding logic puts on the system buffer bandwidth is to use small dedicated error-correction buffers, built into the same integrated circuit as the ECC decoder. Raw data is then read from the disc into an error-correction buffer and held there while the ECC decoder detects any errors and performs any necessary data corrections to the data in the correction buffer. (Additional data fields are "queued" into other error-correction buffers while the ECC decoding takes place.) This architecture allows the ECC decoder to make its data corrections directly in the error-correction buffer, where it has exclusive access. Therefore, the corrections are performed faster than they can be performed in the main data buffer, and no data buffer bandwidth is required by the ECC decoding process.

When the data in the error-correction buffer is either corrected or verified to be correct by the ECC decoder, it can then be transferred to the main data buffer. However, the rate at which the data is transferred, i.e., the amount of system buffer bandwidth consumed by the data field transfer, must be throttled or controlled somehow to prevent a high-bandwidth burst from consuming more than the disc channel's allocation of the system buffer bandwidth for a significant period of time. Therefore, the invention provides a means for throttling the data transfer from the error-correction buffer to the main data buffer so that the system buffer bandwidth allocation is maintained.

FIG. 1 is an exploded view of one embodiment of the present invention, this embodiment showing one type of magnetic disc drive 100 having a rotary actuator. Other embodiments include other configurations and data recording and/or reading technologies. The disc drive 100 includes base 112 and cover 114. The base 112 and cover 114 form a disc enclosure or housing. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 that carries a magnetic transducer 150. In some embodiments, transducer 150 includes an electromagnetic coil write head 97 and a magneto-resistive read head 98. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator assembly 120 opposite the load springs 124 and the sliders 126 is a voice coil 128.

Attached within the base 112 is a first magnet 130 and a second magnet 131. As shown in FIG. 1, the second magnet 131 is associated with the cover 114. The first and second magnets 130, 131, and the voice coil 128 are the key components of a voice coil motor that applies a force to the actuator assembly 120 to rotate it about the actuator shaft 118. Also mounted to the base 112 is a spindle motor. The spindle motor includes a rotating portion called spindle hub 133. In this particular disc drive, the spindle motor is within hub 133. In FIG. 1, a number of discs 134 (one or more; four are shown) are attached to the spindle hub 133 to form disc assembly 132. In other disc drives, a single disc or a different number of discs may be attached to the hub. The invention described herein is equally applicable to disc drives which have a plurality of discs as well as disc drives that have a single disc. The invention described herein is also equally applicable to disc drives with spindle motors that are within the hub 133 or under the hub.

Typical High-Level Disc Drive Architecture

Figure 2:
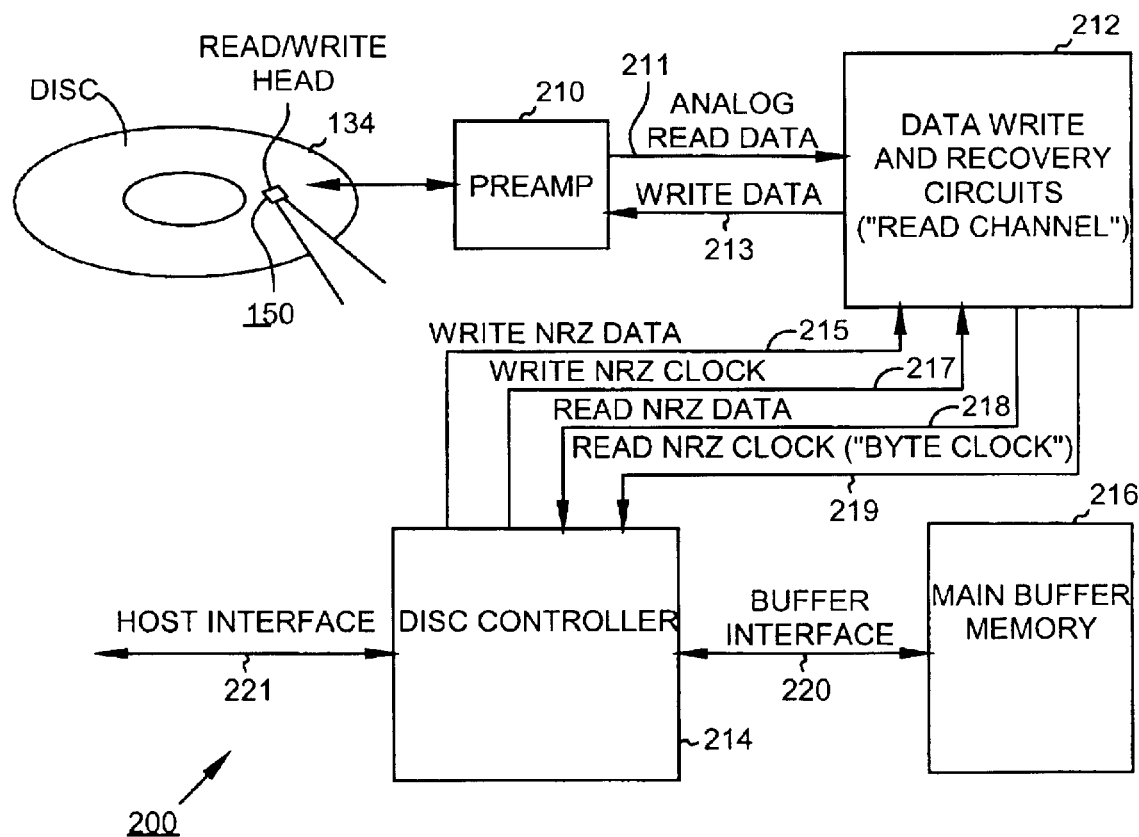
FIG. 2 is a high-level block diagram showing the main data paths for a typical disc drive 100.

FIG. 2 is a high-level block diagram showing the main data paths for a typical disc drive system 100. Only the main data paths between the Host Interface 221 and the disc media 134 are shown, and only the system's main components relevant to the invention are depicted.

One disc 134 is shown, having transducer (read/write head) 150 transferring data between the disc surface 150 and preamp (preamplifier) 210. Write data 213 is transferred from circuit 212 to preamp 210 for write operations, based on write NRZ (non-return-to-zero) data 215 and NRZ clock 217. Analog read data is transferred from preamp 210 to the recovery circuits of read channel 212, which provides NRZ read data 218 and NRZ read clock 219 (also called the "byte clock") to disc controller 214. Data is transferred to and from main buffer memory 216 of the disc drive across buffer interface 220.

The read channel circuitry 212 provides a byte clock 219 to the disc controller 214, matching the disc data rate both during read and write events and during idle periods when no data is being transferred to or from the media.

Disc controller 214 is the heart of the disc drive from a data transfer management perspective. During disc reads, for example, it controls read channel 212 to locate the appropriate physical position of the data on the media and to transfer the data into disc controller 214, through data pipelines and FIFOs, and into main buffer memory 216. Disc controller 214 also typically includes logic to transfer the data from main buffer memory 216, through data pipelines and FIFOs, and across host interface 221. The subsystem within disc controller 214 that is responsible for controlling the data traffic into and out of main buffer memory 216 is referred to as the buffer controller.

Also, disc controller 214 typically includes ECC encoder and decoder logic to protect the integrity of the data stored on the disc media and to correct relatively small errors in the data which result from imperfect disc media and from an imperfect read channel 212. This error correction function within the disc controller 214 typically requires functional support and bandwidth from the buffer controller to access main buffer memory 216.

Typical Buffer Controller System Architecture

Figure 3:
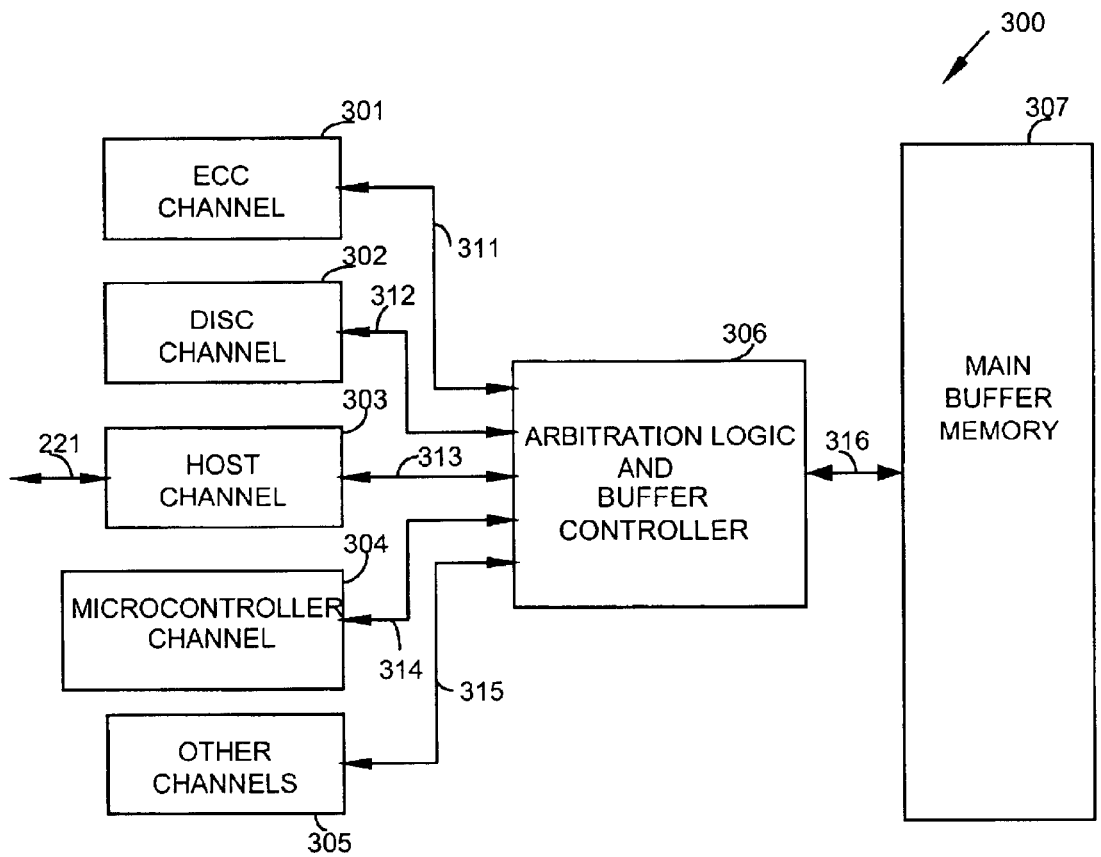
FIG. 3 is a high-level block diagram for a typical buffer controller system in a disc drive.

FIG. 3 represents a high-level block diagram for a typical buffer controller system 300 in a disc drive. Buffer controller 306 provides access to main buffer memory 307 for several data channels, where the number of channels and their bandwidth requirements are dependent on the particular system. For example, host channel 303 typically requires the lion's share of the available buffer bandwidth, followed by disc channel 302 and then the ECC channel 303. (Note that this block diagram is intended only to represent the data transfer paths associated with main buffer memory 307; control logic and interconnections among the channel devices are not shown.)

Figure 4:
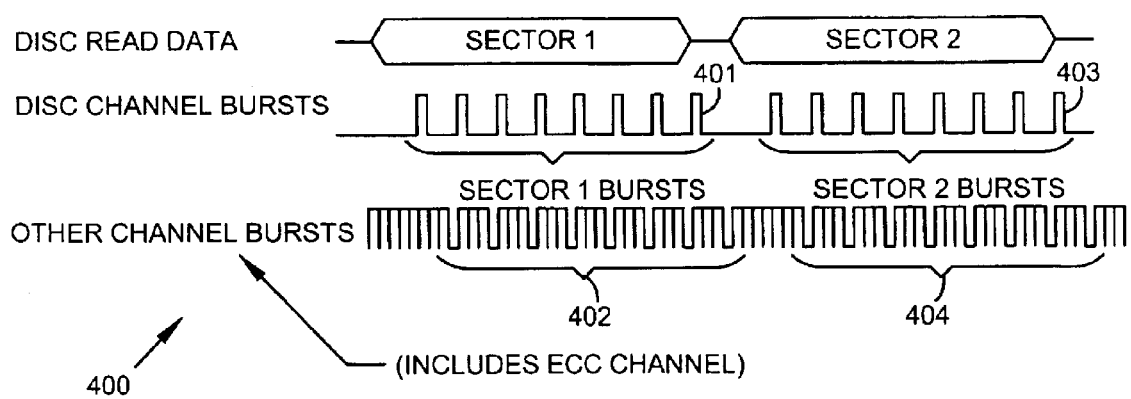
FIG. 4 depicts the buffer bandwidth allocation in time for a typical disc drive buffer controller.

FIG. 4 depicts an example of the buffer bandwidth allocation in time for a typical disc drive buffer controller. As Sector 1 is read from the disc, its data is transferred in bursts 401 to the main buffer memory 307, as represented by each of the pulses 401 on the line labeled "Disc Channel Bursts." (For this example, the sector size is (512) bytes, and the burst size is sixty-four bytes.) Therefore, approximately 75% of the buffer bandwidth is available for other channels during disc read accesses, as indicated by the bottom line. This is an example of one frequency of disc data rate. Typically, the disc data rate varies from the inner diameter to the outer diameter of the disc.

Analysis

The typical buffer controller system represented by FIG. 3 and FIG. 4 works well as long as the buffer bandwidth requirement of the ECC channel 301 is minimal. For example, if the ECC logic can complete the decoding and correcting the data of Sector 1 during the time that the raw data of Sector 2 is being transferred to the buffer 307, the system can sustain the continuous transfer and on-the-fly ECC correction of data from the disc without appreciable performance degradation. Additional pipelining in the ECC decoding logic can further extend the near-real-time error correction capability of the system by allowing some stages of the decoding process to overlap with earlier stages for subsequent sectors.

However, as the buffer bandwidth requirement of the ECC channel 301 increases due to the reasons previously stated, even additional pipelining in the decoder cannot always compensate for the additional decoding delays or for the increased demand on the overall system buffer bandwidth. One way to combat this increase in required ECC buffer bandwidth is to buffer the raw sector data in error-correction buffer 506, as shown in FIG. 5.

Figure 5:
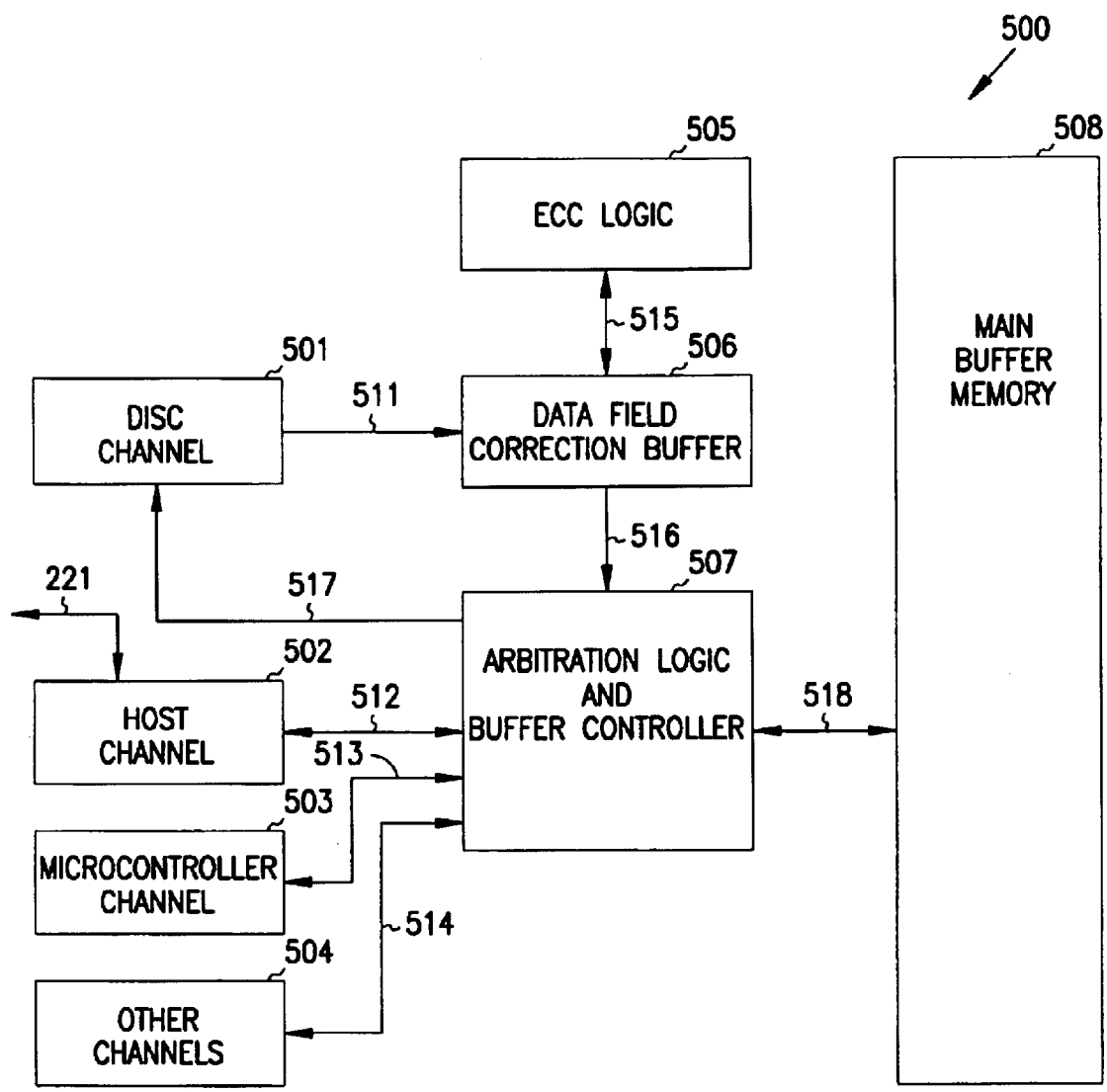
FIG. 5 is a high-level block diagram for an enhanced disc-drive buffer controller.

FIG. 5 is a high-level block diagram for the enhanced disc drive buffer controller 500 of the present invention. The raw data read from the disc 134 across path 511 is stored in error-correction buffer 506 as the ECC logic 505 computes syndromes and calculates any error locations and values. ECC logic 505 performs any necessary data corrections directly in error-correction buffer 506, thereby eliminating any requirement for ECC channel buffer bandwidth from buffer controller 506. Write data goes across path 517 from buffer controller 507 to disc channel 501. Host channel 502, microcontroller channel 503 and other channels 504 coupled to buffer controller 507 across paths 512, 513, and 514 respectively, each compete for bandwidth of main buffer memory 508 by sending arbitration requests to buffer controller 507.

For a read operation, after the data field (i.e., the sector) in error-correction buffer 506 has been corrected or verified as correct by the ECC logic 505, the data is transferred from error-correction buffer 506 to main buffer memory 508 through the disc channel's buffer port. The average rate of data transfer out of error-correction buffer 506 must be the same as the average rate of data transfer into it, so the overall disc channel buffer bandwidth requirement does not change, except that the ECC channel buffer bandwidth is now always zero.

In some embodiments, error-correction buffer 506 is implemented as on-chip memory in a disc-and-buffer-controller integrated circuit to save cost in the overall disc drive system 100. Therefore, error-correction buffer 506 should be made only as large as necessary to sustain a continuous flow of data with on-the-fly error corrections. For example, if the worst-case longest delay from the end of a data field transferred into error-correction buffer 506 to the end of its corresponding error corrections is between one and two sector times, error-correction buffer 506 should be designed to hold up to three sectors of data at any given time.

The advantage of error-correction buffer 506 is that with it the average buffer bandwidth required by the disc channel 501 to main buffer memory 508 is simply equal to the average data throughput of disc channel 501. However, burst bandwidth is just as important to overall system performance as average bandwidth, and the burst bandwidth consumed by error-correction buffer 506 could be excessive.

Figure 6:
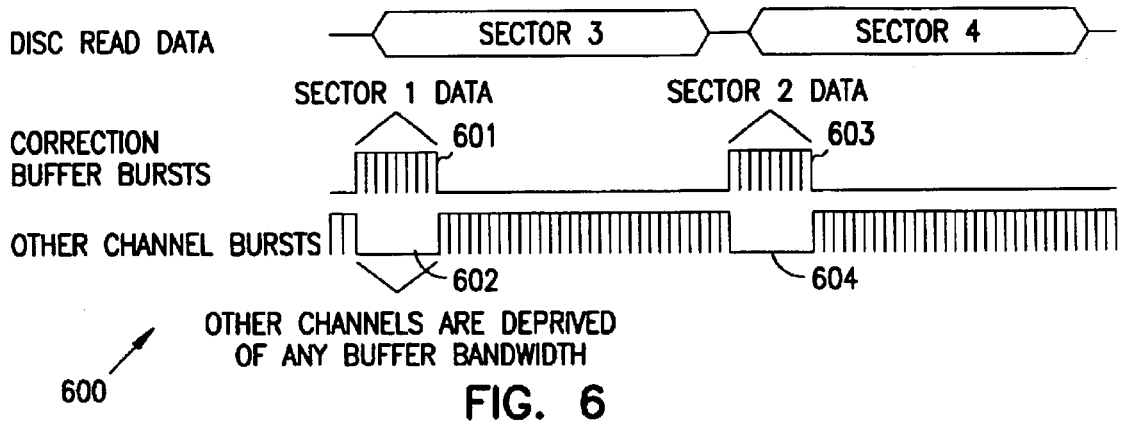
FIG. 6 shows one example of excessive burst buffer bandwidth.

FIG. 6 shows one example of excessive burst buffer bandwidth for error-correction buffer 506. (Notice that the latency of the ECC logic 505 for performing corrections is assumed to be about two sector times for this example.) Since the sector of data in error-correction buffer 506 is made available by the ECC logic 505 all at the same time (i.e., as soon as the sector is corrected, the entire sector is available to be burst to main buffer memory 508), there is no natural system transfer rate to throttle the corresponding data transfer to main buffer memory 508. And since disc channel 501 usually has the highest arbitration priority, all eight bursts from the error-correction buffer 506 occur back-to-back (burst sequences 601 and 603), depriving all other buffer channels of buffer access for an extended period of time 602 and 604. While the period between the series of bursts 601 and the series of bursts 603 is fully available to the other channels, the long latency periods (time delays between the arbitration requests and the arbitration grants) cause data-transfer gaps in the other channels, thus reducing their effective data throughput.

One easy way to reduce the burst buffer bandwidth effect is to modify the arbitration scheme of buffer controller 507 to disallow back-to-back arbitration wins of disc channel 501 if any other channels are arbitrating. In fact, this type of arbitration "fairness" algorithm is common.

Figure 7:
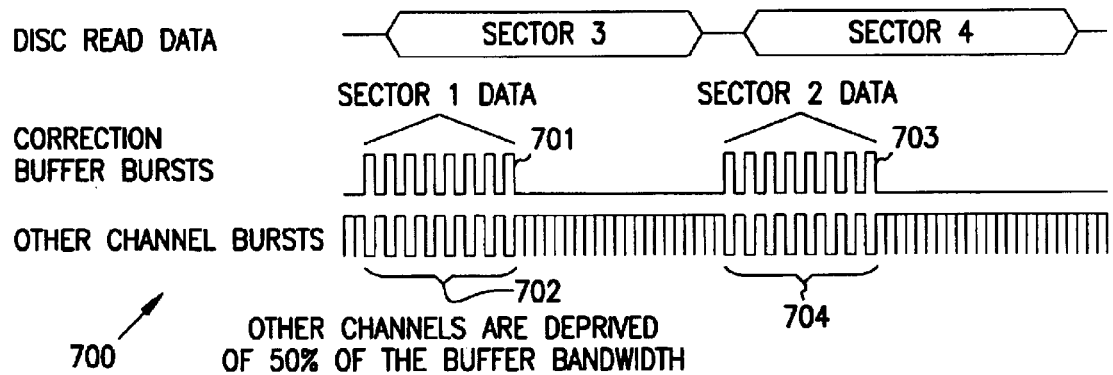
FIG. 7 shows the example of FIG. 6 with the addition of one type of arbitration fairness.

FIG. 7 shows an example similar to that of FIG. 6, but with the addition of one type of arbitration fairness: if any other channel is arbitrating at the end of a disc-channel burst, the disc channel will give up one arbitration. Thus, the series of data-channel bursts 701 from error-correction buffer 506 is interspersed with other channel bursts 702. Unfortunately, a system with this modification still deprives the other buffer channels of 50% of the total buffer bandwidth during the disc channel's series of bursts. In most high-performance disc drives, peak data transfer rates of host channel 502 exceed half of the drive's overall buffer bandwidth. The time corresponding to the series of bursts of disc channel 506 would still be reflected in reduced host bus data transfer rates, and therefore a lower overall host bus efficiency.

Error-correction buffer 506 eliminates the buffer bandwidth requirement of the ECC channel 301 of FIG. 3. But to fully optimize a system based on this concept, the system needs a means for throttling the burst buffer bandwidth requirement of disc channel 506 to closely match the actual disc data rate.

Figure 8:
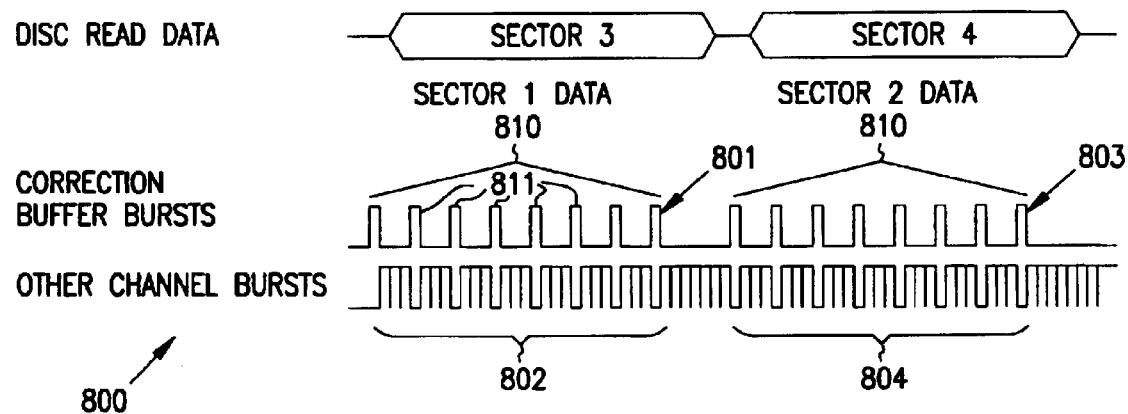
FIG. 8 shows an example of the time distribution of buffer bandwidth for a system having throttled data transfer bursts from an error-correction buffer.

FIG. 8 shows one embodiment of the time distribution of buffer bandwidth for a system of the present invention having a throttled data transfer burst series from error-correction buffer 506. The data bursts 811 in the series of data bursts 810 are spread substantially evenly across the transfer time of a sector. Although the data of disc channel 501 is delayed (in this case by approximately two sector times, since Sector 1 data 801 is transferred out as Sector 3 data is transferred in, and Sector 2 data 803 is transferred out as Sector 4 data is transferred in) in error-correction buffer 506, it is transferred to the main buffer memory 508 with the same average and burst bandwidth characteristics as for the original system 300 of FIG. 3 and FIG. 4. However, note that in the original system 300 (refer to the timing diagram of FIG. 4), the line labeled "Other Channel Bursts" includes buffer accesses of ECC channel 301; in the new system, no ECC Channel buffer accesses exist, and that additional bandwidth is available for other channels, especially host channel 502.

Throttling the Error-Correction Buffer

A circuit is needed to throttle arbitration requests of error-correction buffer 506 to buffer controller 507, so that the buffer bandwidth devoted to disc channel 501 for each sector is spread out over approximately one sector time, as shown in FIG. 8. The block diagram of FIG. 9 depicts such a throttling circuit.

Figure 9:
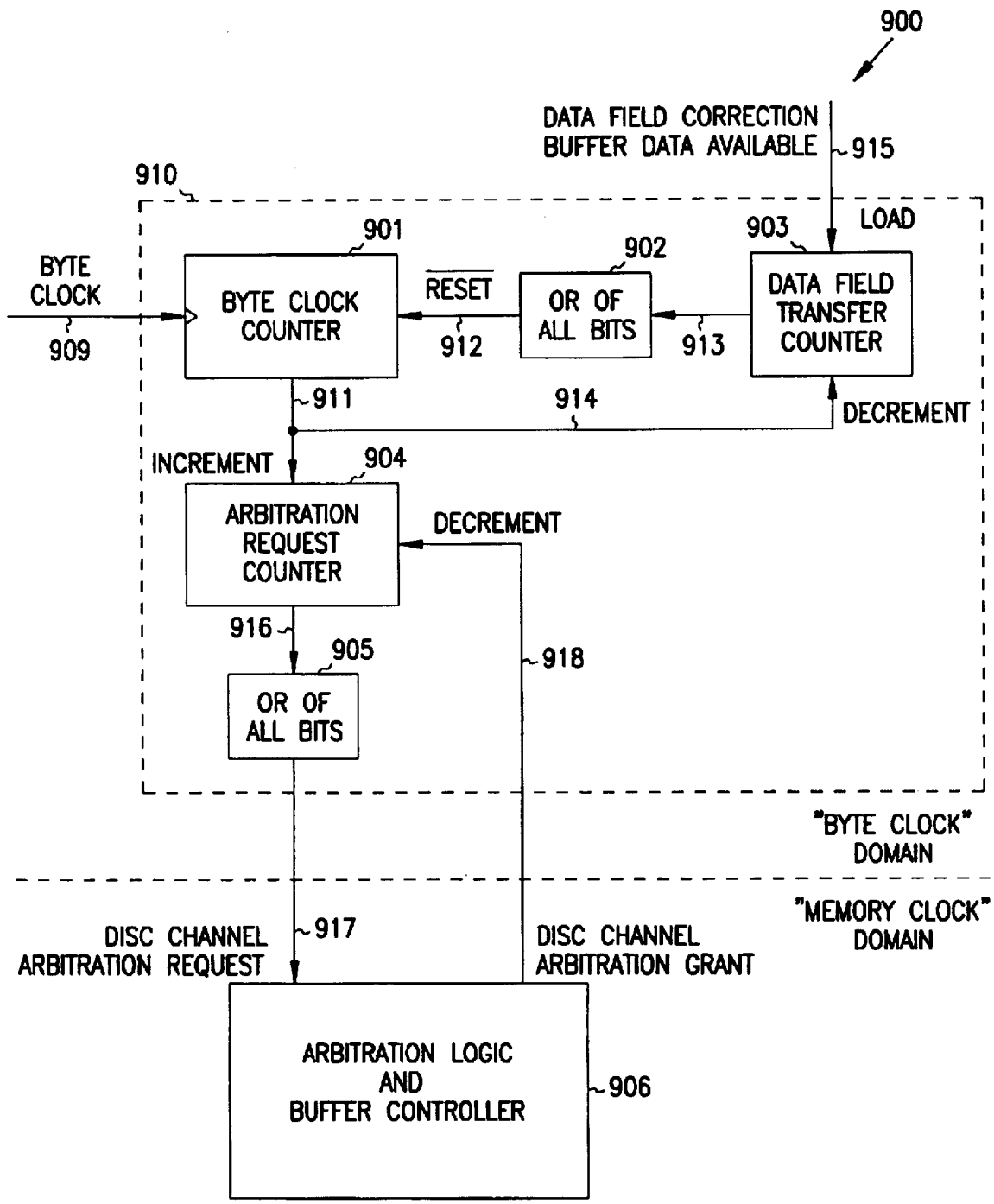
FIG. 9 shows an example throttling logic circuit 900 for an error-correction buffer.

FIG. 9 shows one embodiment of throttling logic circuit 900 for error-correction buffer 506. Byte-clock counter 901 is designed to count Byte Clock periods generated by the disc drive's read channel and sent to the disc formatter circuitry. Note that the Byte Clock is simply a clock which is matched to the actual frequency of data transfer from the disc media, and it does not necessarily have to be a clock which represents eight bits of data transfer. For example, if the system is designed to transfer 16-bit words from the read channel instead of 8-bit bytes, the throttling logic would use the Word Clock (i.e., one pulse for each 16 bits), and the principal is unchanged. Further, the invention is described in terms of transferring a "sector" quantity of data into the error-correction buffer that contains (512) bytes of data, and is considered to be "one sector." Other embodiments use a quantity of data that is still referred to as a "sector quantity of data" but that quantity of data may have other than (512) bytes of data, and may not be referred to as "one sector."

For the example system having the transfers of FIG. 8, the burst transfer length for disc channel 501 is sixty-four (64) bytes. Therefore, eight bursts transfer a single (512)-byte sector. For this example system, byte-clock counter 901 in FIG. 9 is designed to produce an output pulse once every sixty-four Byte Clocks. When error-correction buffer 506 has a sector of data (512 bytes) available to transfer to main buffer memory 508, it sends a Load pulse 915 to data field transfer counter 903, which loads counter 903 with the number of bursts in the sector (a value representing eight in this case). When data field transfer counter 903 is non-zero, OR gate 902 releases the Reset input 912 (negative logic in this case) to byte-clock counter 901, allowing byte-clock counter 901 to begin producing output pulses 911 once every sixty-four Byte Clocks.

Each pulse output 911 by byte-clock counter 901 decrements data field transfer counter 903 and increments arbitration request counter 904. While arbitration request counter 904 is non-zero, a Disc Channel Arbitration Request signal 917 is sent (in one embodiment, by OR gate 905) to the arbitration logic of buffer controller 507. When the buffer controller 507 grants the arbitration request, it sends a Disc Channel Arbitration Grant signal 918 to decrement arbitration request counter 904. For some embodiments, arbitration request counter 904 will toggle back and forth between one and zero as each data transfer burst length is first made available by byte clock counter 901 and then transferred to main buffer memory 508. In systems that require a deeper disc-data FIFO, i.e., greater than two bursts in length, arbitration request counter 904 is made larger than a single bit. When data field transfer counter 903 decrements to zero, all the arbitration requests (eight in this case) for the corresponding sector in error-correction buffer 506 have been produced, and byte clock counter 901 will be held in its reset state until the next sector of data is made available, thus generating no additional Disc Channel Arbitration Requests.

Figure 10:
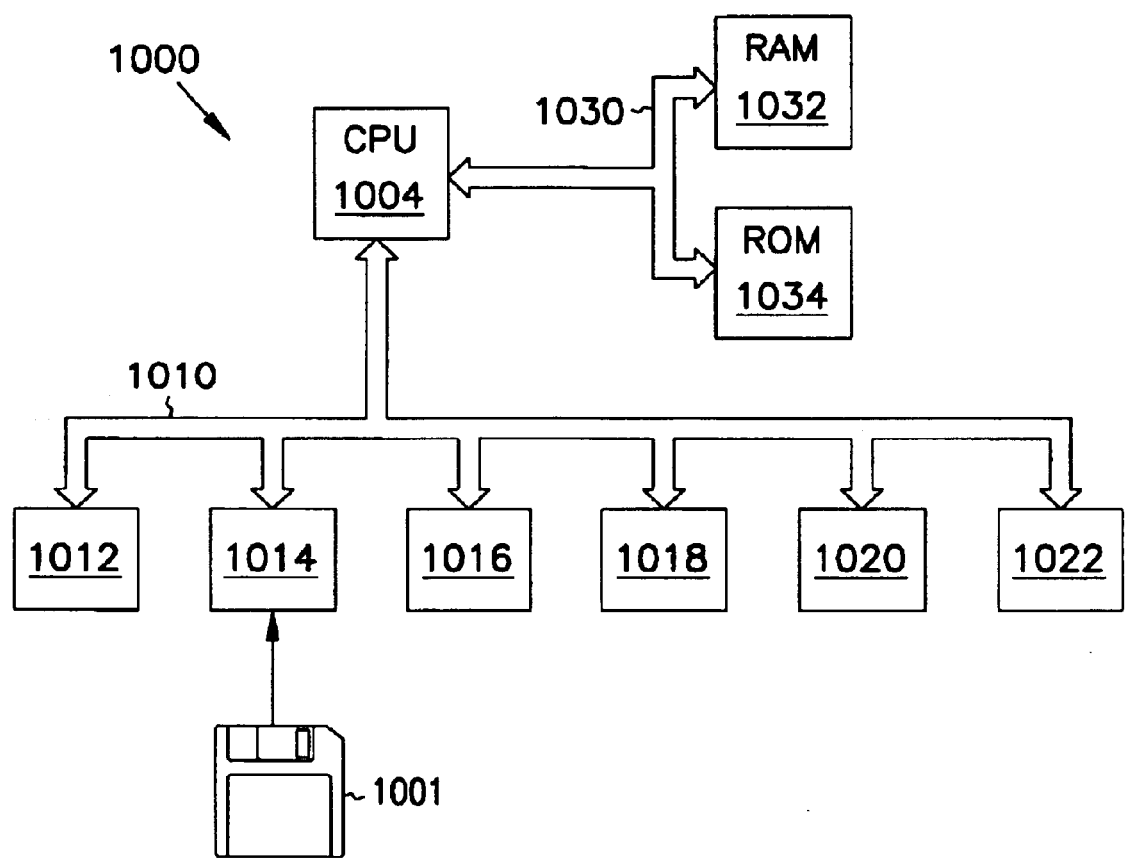
FIG. 10 shows an example data-handling system 1000 that includes the present invention.

Some embodiments of disc-drive system 100 further include data-handling system 1000, shown in FIG. 10, operatively coupled to at least read data from the disc 134. The data-handling system 1000 further includes one or more data processors 1004, one or more memories such as random access memory 1032 and read-only memory 1034 operatively coupled to each one of the one or more data processors 1004, and at least one input/output system 1014–1022 coupled to at least one of the one or more data processors to receive input data and to supply output data. In FIG. 10, block 1012 includes one or more disc drives 100 having buffer controller 507 and/or control circuit 900 as described above. In some embodiments, block 1014 is a diskette drive that reads data from diskette 1001 (or other computer readable media).

CONCLUSION

Described above is a method and apparatus for an error-correction buffer having self-throttling data burst control in a disc drive.

One aspect of the present invention provides an arbitration-throttling control circuit 900 for use in a disc drive 100 to self-throttle data transfer of an error-correction buffer. The arbitration-throttling control circuit 900 includes an error-correction buffer interface 915, a disc-drive main buffer memory interface circuit 906, and a control circuit 910. The error-correction buffer interface 915 monitors availability of data from the error-correction buffer 506. The disc-drive main-buffer-memory interface 518 controls data transfer from the error-correction buffer 506 to a disc-drive main buffer memory 508 in a plurality of data bursts 811. Each data burst 811 has a predetermined "burst" quantity of data. The arbitration-throttling control circuit 900 is operatively coupled to the error-correction buffer interface 507 and to the disc-drive main-buffer-memory interface 518. The arbitration-throttling control circuit 900 arbitrates for access to transfer data into the disc-drive main buffer memory 508 such that a series 810 of data bursts 811 totaling a predetermined sector quantity of data from the error-correction buffer 506 to the disc-drive main buffer memory 508 is spread substantially evenly over a period of time substantially equal to a transfer time of the sector quantity of data into the error-correction buffer, wherein the sector quantity of data is larger than the burst quantity of data. Note that the "sector quantity" of data can, but need not, equal (512) bytes or a sector of data, but indicates a quantity of data made available by the error-correction buffer 506.

In some embodiments of the arbitration-throttling control circuit 900, upon an indication 915 that the sector quantity of data from the error-correction buffer 506 is available for transfer, the circuit 900 provides one arbitration request 917 to obtain data transfer access to the disc-drive main buffer memory 508 from the error-correction buffer 506 for each time period substantially equal to a time needed for a burst quantity of data to be transferred from the disc 134.

In some embodiments of the arbitration-throttling control circuit 900, the sector quantity of data includes (512) data bytes, each one of the data bursts 811 of the burst quantity of data includes sixty-four data bytes, and the buffer controller 507 enables up to one additional data burst 811 from error-correction buffer 506 for each time period substantially equal to a time needed for a burst quantity of data to be transferred from the disc 134.

In some embodiments of the arbitration-throttling control circuit 900, the buffer controller further includes a byte-clock counter 901 that is clocked based on a frequency of data transfer from the disc, and that produces an output pulse 911 based on the byte-clock counter 901 counting a predetermined number of clock cycles, an arbitration request counter 904, operatively coupled to the byte-clock counter 901, that is incremented by the output pulse of the byte-clock counter 901, that is decremented when a disc-channel arbitration grant 918 is obtained, and that produces a disc-channel arbitration request 917 if the arbitration request counter 904 has a value of one or more, and an arbitration logic 905, operatively coupled to the arbitration request counter 904, that receives disc-channel arbitration requests 917 and provides disc-channel arbitration grants 918, in order to spread data bursts from the error-correction buffer 506 to the disc-drive main buffer memory 508 over a period of time substantially equal to the sector transfer time.

In some such embodiments of arbitration-throttling control circuit 900, the circuit further includes a reset circuit 902/903 configured to reset the byte-clock counter 901 based on a data availability of data out of the error-correction buffer 506.

In some embodiments of the arbitration-throttling control circuit 900, each one of the data bursts includes N data bytes, and the arbitration request counter 904 is incremented once for each N byte-clock cycles.

In some embodiments of the arbitration-throttling control circuit 900, a sector transfer includes (512) data bytes, each one of the data bursts includes sixty-four data bytes, and the arbitration request counter 904 is incremented once for each time period substantially equal to a time needed for a burst quantity of data to be transferred from the disc 134.

Another aspect of the present invention provides a disc-drive system 100. Disc drive system 100 includes a disc case 112/114, a disc 134 rotatably mounted within the disc case 112/114, an actuator assembly 123 mounted within the disc case 112/114. The actuator assembly 123 includes a transducer head 150 in transducing relationship to the disc 134. Disc drive system 100 also includes an error-correction buffer 506 operatively coupled to receive data from the transducer head 150 at a disc data rate, a disc-drive main buffer memory 508 operatively coupled to receive data from the error-correction buffer 506 in a plurality of data bursts, each data burst having a burst data rate higher than the disc data rate and each data burst transferring a predetermined burst quantity of data. Disc drive system 100 further includes a system interface 221, a disc-drive controller 214 operatively coupled to transfer data from the disc-drive main buffer memory 508 to the system interface 221, and an arbitration-throttling control circuit 900 that arbitrates for access to transfer data into the disc-drive main buffer memory 508 such that data bursts totaling a sector quantity of data from the error-correction buffer 506 to the disc-drive main buffer memory 508 are spread substantially evenly over a period of time substantially equal to a transfer time of the sector quantity of data from disc 134 into the error-correction buffer 506, wherein the sector quantity of data is larger than the burst quantity of data.

In some embodiments of disc-drive system 100, arbitration-throttling control circuit 900, upon an indication 915 that the sector quantity of data from the error-correction buffer 506 is available for transfer, provides one arbitration request 917 to obtain data transfer access to the disc-drive main buffer memory 508 from the error-correction buffer 506 for each time period substantially equal to a time needed for a burst quantity of data to be transferred from the disc 134.

In some embodiments of disc-drive system 100, the sector quantity of data includes (512) data bytes, each one of the data bursts of the burst quantity of data includes sixty-four data bytes, and the arbitration-throttling control circuit 900 enables up to one additional data burst to occur each time period substantially equal to a time needed for a burst quantity of data to be transferred from the disc 134.

In some embodiments of disc-drive system 100, the arbitration-throttling control circuit 900 further includes a byte-clock counter 901 that is clocked based on a rate of data transfer from the disc, and that produces an output pulse based on counting a predetermined number of clock cycles, an arbitration request counter 904, operatively coupled to the byte-clock counter 901, that is incremented by the output pulse of the byte-clock counter 901, that is decremented when a disc-channel arbitration grant is obtained, and that produces a disc-channel arbitration request if the arbitration request counter 904 has a value of one or more, and arbitration logic 906, operatively coupled to the arbitration request counter 904, that receives disc-channel arbitration requests and provides disc-channel arbitration grants, in order to spread data bursts from the error-correction buffer 506 to the disc-drive main buffer memory 508 over a period of time substantially equal to the sector transfer time.

In some embodiments of disc-drive system 100, the arbitration-throttling control circuit 900 further includes a reset circuit 902/903 configured to reset the byte-clock counter 901 based on a data transfer count of data out of the error-correction buffer.

In some embodiments of disc-drive system 100, each one of the data bursts includes N data bytes, and the arbitration request counter 904 is incremented once for each N byte-clock cycles.

In some embodiments of disc-drive system 100, a sector transfer includes (512) data bytes, each one of the data bursts includes sixty-four data bytes, and the arbitration request counter 904 is incremented once each time period substantially equal to a time needed for a burst quantity of data to be transferred from the disc 134.

Some embodiments of disc-drive system 100 further include data-handling system 1000 operatively coupled to at least read data from the disc 134. The data-handling system 1000 further includes one or more data processors 1004, one or more memories 1032, 1034 operatively coupled to each one of the one or more data processors, and at least one input/output system 1014–1022 coupled to at least one of the one or more data processors to receive input data and to supply output data.

Another aspect of the present invention provides a method for self-throttling data transfer in an error-correction buffer in a disc drive. The method includes (a) receiving data into the error-correction buffer from a disc transducer at a disc data rate, and (b) transferring the data out of the error-correction buffer in a plurality of data bursts, each one of the data bursts having a burst data rate that is higher than the disc data rate, the data bursts having a spacing based on a timing signal derived from the disc data rate.

Some embodiments of the method further include (c) performing an error correction operation on the data within the error-correction buffer 506 before performing the transferring step (b).

In some embodiments of the method, the transferring step (b) further includes (b)(i) deriving a burst-enable pulse by dividing a clock signal by a predetermined value, wherein the clock signal is based on the disc data rate, and the predetermined value is based on an amount of data in one of the plurality of data bursts.

In some embodiments of the method, the transferring step (b) further includes (b)(ii) upon an indication that the sector quantity of data from the error-correction buffer is available for transfer, providing an arbitration request to obtain data transfer access to the disc-drive main buffer memory 508 from the error-correction buffer 506 for each time period substantially equal to a time needed for a burst quantity of data to be transferred from the disc.

Yet another aspect of the present invention provides a disc drive system 100 that includes a base plate, a rotatable disc mounted to the base plate, an actuator, the actuator including a transducer mounted to the actuator in transducing relation to the disc, and buffer memory means operatively coupled to the transducer for self-throttling data bursts of an error-correction buffer as described herein.

It is to be understood that the above description is intended to be illustrative, and not restrictive. Although numerous characteristics and advantages of various embodiments of the present invention have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled.

What is claimed is:

1. A circuit comprising:
    a first buffer interface that monitors availability of data from a first buffer;
    a second buffer interface that controls data transfer from the first buffer to a second buffer in a plurality of data bursts, each data burst having a predetermined burst quantity of data; and
    a control circuit, coupled to the interfaces that arbitrates for access to transfer data into the second buffer such that a series of data bursts totaling a predetermined quantity of data from the first buffer to the second buffer is spread substantially evenly over a period of time substantially equal to a transfer time of the predetermined quantity of data into the first buffer, wherein the predetermined quantity of data is larger than the burst quantity of data.

2. The circuit of claim 1, wherein the circuit, upon an indication that the predetermined quantity of data from the first buffer is available for transfer, provides one arbitration request to obtain data transfer access to the second buffer from the first buffer.

3. The circuit of claim 1, wherein the predetermined quantity of data includes (512) data bytes, each one of the data bursts of the burst quantity of data includes sixty-four data bytes, and a buffer controller enables up to one additional data burst to occur each time period substantially equal to a time needed for sixty-four data bytes to be transferred from the disc.

4. The circuit of claim 3, wherein the buffer controller further comprises:
    a byte-clock counter that is clocked based on a frequency of data transfer from the disc, and that produces an output pulse based on the byte-clock counter counting a predetermined number of clock cycles:
    an arbitration request counter, operatively coupled to the byte-clock counter, that is incremented by the output pulse of the byte-clock counter, that is decremented when a disc-channel arbitration grant is obtained, and that produces a disk-channel arbitration request if the arbitration request counter has a value of one or more; and
    an arbitration logic, operatively coupled to the arbitration request counter, that receives disc-channel arbitration requests and provides disc channel arbitration grants, in order to spread data bursts from the error-correction buffer to the disc-drive main buffer memory over a period of time substantially equal to the sector transfer time.

5. The circuit of claim 4, wherein the buffer controller further comprises:
    a reset circuit configured to reset the byte-clock counter based on a data availability of data out of the error-correction buffer.

6. The circuit of claim 4, wherein each one of the data bursts includes N data bytes, and the arbitration request counter is incremented once for each N byte-clock cycles.

7. The circuit of claim 4, wherein a sector transfer includes (512) data bytes, each one of the data bursts includes sixty-four data bytes, and the arbitration request counter is incremented once for each time period substantially equal to a time needed for sixty-four data bytes to be transferred from the disc.

8. An apparatus comprising:
    a first data store coupled to receive data at a first data rate;
    wherein the apparatus is configured to transfer data bursts totaling an amount of received data from the first data store that are spread substantially evenly over a period of time substantially equal to a transfer time of the predetermined quantity of data into the first data store wherein the amount of received data is larger than the burst quantity of data.

9. The apparatus of claim 8 further comprising:
    an arbitration-throttling control circuit; and
    a second data store, wherein the arbitration-throttling control circuit, upon an indication that the amount of received data from the first data store is available for transfer, provides one arbitration request to obtain data transfer access to the second data store from the first data store for each time period substantially equal to a time needed for the burst quantity of data to be transferred.

10. The apparatus of claim 9, wherein the amount of received data includes (512) data bytes, each one of the data bursts of the burst quantity of data includes sixty-four data bytes, and the arbitration-throttling control circuit enables up to one additional data burst to occur each time period substantially equal to a time needed for sixty-four data bytes to be transferred from a storage medium.

11. The apparatus of claim 9, wherein the arbitration-throttling control circuit further comprises:
    a byte-clock counter that is clocked based on a rate of data transfer from the storage medium, and that produces an output pulse based on the byte-clock counter counting a predetermined number of clock cycles;
    an arbitration request counter, operatively coupled to the byte-clock counter, that is incremented by the output pulse of the byte-clock counter, that is decremented when a disc-channel arbitration grant is obtained, and that produces a disc-channel arbitration request if the arbitration request counter has a value of one or more; and
    an arbitration logic, operatively coupled to the arbitration request counter, that receives disc-channel arbitration requests and provides disc-channel arbitration grants, in order to spread data bursts from the first data store to the second data store over a period of time substantially equal to the transfer time of the received data.

12. The apparatus of claim 11, wherein the arbitration-throttling control circuit further comprises:
    a reset circuit configured to reset the byte-clock counter based on a data transfer count of data out of the first data store.

13. The apparatus claim 11, wherein each one of the data bursts includes N data bytes, and the arbitration request counter is incremented once for each N byte-clock cycles.

14. The apparatus of claim 11, wherein a sector transfer includes (512) data bytes, each one of the data bursts includes sixty-four data bytes, and the arbitration request counter is incremented once for each time period substantially equal to a time needed for sixty-four data bytes to be transferred from the disc.

15. The apparatus of claim 11, further comprising:
    a data-handling system operatively coupled to at least read data from the disc, the data-handling system further comprising:
    one or more data processors;
    one or more memories operatively coupled to each one of the one or more data processors; and at least one input/output system coupled to at least one of the one or more data processors to receive input data and to supply output data.

16. The apparatus of claim 8 further comprising a second data store coupled to receive the data bursts from the first data store, each data burst having a burst data rate higher than the first data rate.

17. A method comprising steps of:
(a) receiving data into first buffer at a first data rate; and
(b) transferring the data out of the first buffer in a plurality of data bursts, each one of the data bursts having a burst data rate that is higher than the first data rate, the data bursts having a timing based on the first data rate.

18. The method according to claim 17, further comprising a step of:
(c) performing an error correction operation on the data within the first buffer before performing the transferring step (b).

19. The method according to claim 17, wherein the transferring step (b) further comprises:
(b)(i) deriving a burst-enable pulse by dividing a clock signal by a predetermined value, wherein the clock signal is based an the first data rate, and the predetermined value is based on an amount of data in one of the plurality of data bursts.

20. The method according to claim 17, wherein the transferring step (b) further
comprises:
(b)(ii) upon an indication that the sector quantity of data from the first buffer is available for transfer, providing an arbitration request to obtain data transfer access to a second buffer from the first buffer for each time period substantially equal to a time needed for a burst quantity of data to be transferred.

21. A disc drive system comprising:
a base plate;
a rotatable disc mounted to the base plate;
an actuator, the actuator including a transducer mounted to the actuator in transducing relation to the disc:
buffer memory means operatively coupled to the transducer for self-throttling data bursts of an error-correction buffer.

* * * * *